(12) United States Patent
Popovski et al.

(10) Patent No.: US 8,224,781 B2
(45) Date of Patent: Jul. 17, 2012

(54) DATA PROTECTION IN A DATA STORAGE SYSTEM

(75) Inventors: Vladimir Popovski, Irvine, CA (US); Nelson Nahum, Tustin, CA (US)

(73) Assignee: LSI Corporation, Milpitas, CA (US)

( * ) Notice: Subject to any disclaimer, the term of this patent is extended or adjusted under 35 U.S.C. 154(b) by 259 days.

(21) Appl. No.: 12/780,552

(22) Filed: May 14, 2010

(65) Prior Publication Data
US 2011/0282842 A1 Nov. 17, 2011

(51) Int. Cl.
*G06F 17/30* (2006.01)
(52) U.S. Cl. .......................................... 707/649; 707/639
(58) Field of Classification Search .................. 707/639, 707/649
See application file for complete search history.

(56) References Cited

U.S. PATENT DOCUMENTS

| | | | |
|---|---|---|---|
| 6,877,109 B2 * | 4/2005 | Delaney et al. | 714/6.32 |
| 6,981,114 B1 * | 12/2005 | Wu et al. | 711/162 |
| 7,334,098 B1 * | 2/2008 | Poston | 711/162 |
| 7,373,366 B1 * | 5/2008 | Chatterjee et al. | 1/1 |
| 7,882,067 B2 * | 2/2011 | Saika | 707/639 |
| 2004/0141498 A1 * | 7/2004 | Rangan et al. | 370/380 |
| 2007/0198605 A1 * | 8/2007 | Saika | 707/202 |
| 2008/0028009 A1 | 1/2008 | Ngo | |
| 2008/0162590 A1 | 7/2008 | Kundu et al. | |
| 2008/0195890 A1 | 8/2008 | Earhart et al. | |
| 2008/0222492 A1 | 9/2008 | Earhart et al. | |
| 2008/0229037 A1 | 9/2008 | Bunte et al. | |
| 2008/0229147 A1 | 9/2008 | Earhart et al. | |
| 2009/0019459 A1 | 1/2009 | Rowan et al. | |
| 2011/0071983 A1 * | 3/2011 | Murase | 707/649 |

* cited by examiner

*Primary Examiner* — Cheryl Lewis
(74) *Attorney, Agent, or Firm* — Duft Bornsen & Fishman LLP

(57) ABSTRACT

Systems and methods herein provide for protecting data using snapshots and images of those snapshots to quickly recreate data upon request. For example, a storage controller of a data storage system allocates a period of time between creating snapshots of data in a first storage volume of the data storage system. The controller then logs received write requests to the first storage volume and generates snapshot of data in the first storage volume based on the allocated period of time. Thereafter, the controller may receive a request to recreate data. The controller locates the snapshot in the first storage volume based on that request to recreate the data. In doing so, the controller generates a snapshot image in a second storage volume. The controller then retrieves logged write requests and applies them to the snapshot image to recreate the data in the second storage volume.

20 Claims, 10 Drawing Sheets

Data Journal (Write Request Journal 110)

| | |
|---|---|
| Log ID | - 8 bytes |
| Date+time | - 4 bytes |
| Write LBA | - 8 bytes – Logical Block Address (LBA) for a write request on virtual volume |
| Write length | - 8 bytes – number of LBAs in a write request |
| Initiator | ID of the device sending the write request |
| Data | |

Completion flag (to overwrite after data + optional checksum)

*FIG. 3A*

Short Journal (Write Request Journal Information 180)

| | |
|---|---|
| Log ID | - 8 bytes |
| Date+time | - 4 bytes |
| Write LBA | - 8 bytes – Logical Block Address for the request on virtual volume |
| Write length | - 8 bytes – number of LBAs in a write request |
| Initiator | ID of the device sending the write request |

Index of corresponding Journal block
Offset from the beginning of corresponding Journal block
Status of the request (if it was applied to the original volume and/or the Data Journal)

*FIG. 3B*

DATA PROTECTION IN A DATA STORAGE SYSTEM

BACKGROUND

1. Field of the Invention

The invention relates generally to protecting data in a data storage system. More specifically, the invention relates to continuous data protection using a combination of snapshot and journaling mechanisms and rebuilding data in a storage volume.

2. Discussion of Related Art

A typical large-scale storage system includes many diverse storage resources, including storage subsystems and storage networks. Many contemporary storage systems also control data storage and create backup copies of stored data to ensure that the data is always available. Often these stored systems have storage management that creates one or more logical volumes where the data in each volume is manipulated as a single storage device. In some instances, the volumes are managed as a single device through a technique called "storage virtualization".

Storage virtualization allows storage capacity that is physically spread throughout a plurality of storage devices to be treated as a single logical pool of storage. Although an end user sees a single interface where all of the available storage appears as a single pool of local disk storage, the data may actually reside on different storage devices in different places. The data may even be moved to other storage devices without a user's knowledge. A storage virtualization module (SVM) masks the details of the individual storage devices, their actual locations, and the manner of accessing them, by mapping logical storage addresses to physical storage addresses. The SVM is configured between the host servers and the physical storage such that host server applications or file systems can mount logical volumes as seemingly physical drives without regard to the physical storage location or vendor type.

Regardless of the type of data storage system management, continuous data protection (CDP) is often a concern. CDP is the instant backup of computer data, where each change to the data is captured. CDP systems generally track every change to the data, but restore data by applying changes "backwards" in a relatively time consuming manner. For example, certain CDP systems modify original data in order to return back in time. Other types of CDP are "near contiguous" in that they provide snapshot like data restoration. While a user may be able restore data at particular point-in-time, the user loses the ability to restore data of a particular I/O request (input/output request).

A snapshot may be thought of as a representation or image of a primary copy of data at a given point in time. A snapshot generally creates a bit map or block level representation of a primary copy of a storage volume at a particular moment in time. Users typically gain a read-only access to the record of files and directories of the snapshot. By electing to restore the primary copy of the storage volume from a given snapshot taken, users may return the current file system to the prior state of the file system that existed when the snapshot was taken. A snapshot may be created instantly, using a minimum of file space, but may still function as a conventional file system backup. A snapshot may not actually create another physical copy of all the data, but may simply create pointers that are mapped to specific blocks of data taken at the point in time of the snapshot. Without more, however, this process can be relatively time consuming and make the data unavailable until a decision as to the integrity of the data can be made.

SUMMARY

Systems and methods presented herein overcome the above mentioned problems by providing a means for protecting data in a data storage system (e.g., a virtualized data storage system) that uses snapshots and images of those snapshots to quickly recreate data upon request. In this regard, journaling and snapshots are combined to implement CDP. The CDP systems and methods presented herein do so by creating a presentation of snapshot that is closest in time to the data requested. These systems reapply changes between a snapshot's time of creation and the time of the requested data. With this approach, the original data remains intact as changes are applied to a "snapshot image". One advantage of this approach is the ability to create and retain several snapshots for a virtual volume (e.g., thousands) such that the duration of a data restoration is a matter of minutes or seconds (e.g., the time required to apply changes between a snapshot closest to a required time). These systems and methods may be implemented in a variety of ways that include hardware, software, firmware, or combinations thereof. For example, these systems and methods may be implemented in the storage controller of a data storage system using various software modules and hardware components. Other embodiments may include such software modules on a computer readable medium having instructions for directing a processor to operate in accordance with the method below.

In one embodiment, a method includes allocating a period of time (either variable or constant) between creating snapshots of data in a first storage volume (e.g., a logical volume), receiving and logging write requests to the first storage volume, generating a snapshot of data in the first storage volume after the allocated period of time, receiving a request to recreate data, locating the snapshot of data in the first storage volume based on the request to recreate the data, generating a snapshot image in a second storage volume (another logical volume) based on the located snapshot. The snapshot image includes data obtained from the located snapshot. The method also includes retrieving logged write requests received after the snapshot was generated, and applying the logged write requests to the snapshot image to recreate the data of the first storage volume in the second storage volume.

The method may further include logging subsequently received write requests and directing the subsequently received write requests to the first and second storage volumes. The method may further include comparing the second storage volume to the first storage volume after recreating the data in the second storage volume to determine inconsistency between the two volumes. The method may further include ceasing write requests to the first storage volume upon determining an inconsistency between the two volumes. The method may further include presenting the comparison to an end user. The method may further include generating a journal to log the write requests and storing the journal in: the first storage volume; the second storage volume; memory of a storage controller; memory of a network computing device; or a combination thereof. The method may further include a lookup table that includes information about each received write request in the journal associated with the snapshot to identify a location of the write requests. The method may also include processing the request to recreate data to extract a time stamp in the request and identify the snapshot.

BRIEF DESCRIPTION OF THE DRAWINGS

FIGS. 3A and B illustrate write request information associated with each write request in the journal.

DETAILED DESCRIPTION OF THE DRAWINGS

FIGS. 1-10 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents. Additionally, in many instances, the drawings include multiple similar elements and are therefore labeled with the designations "1 . . . n" throughout the drawings and the specification. As used herein, the letter "n" simply refers to an integer greater than 1 that is not necessarily equating any number of elements to another number of elements.

Figure 1:
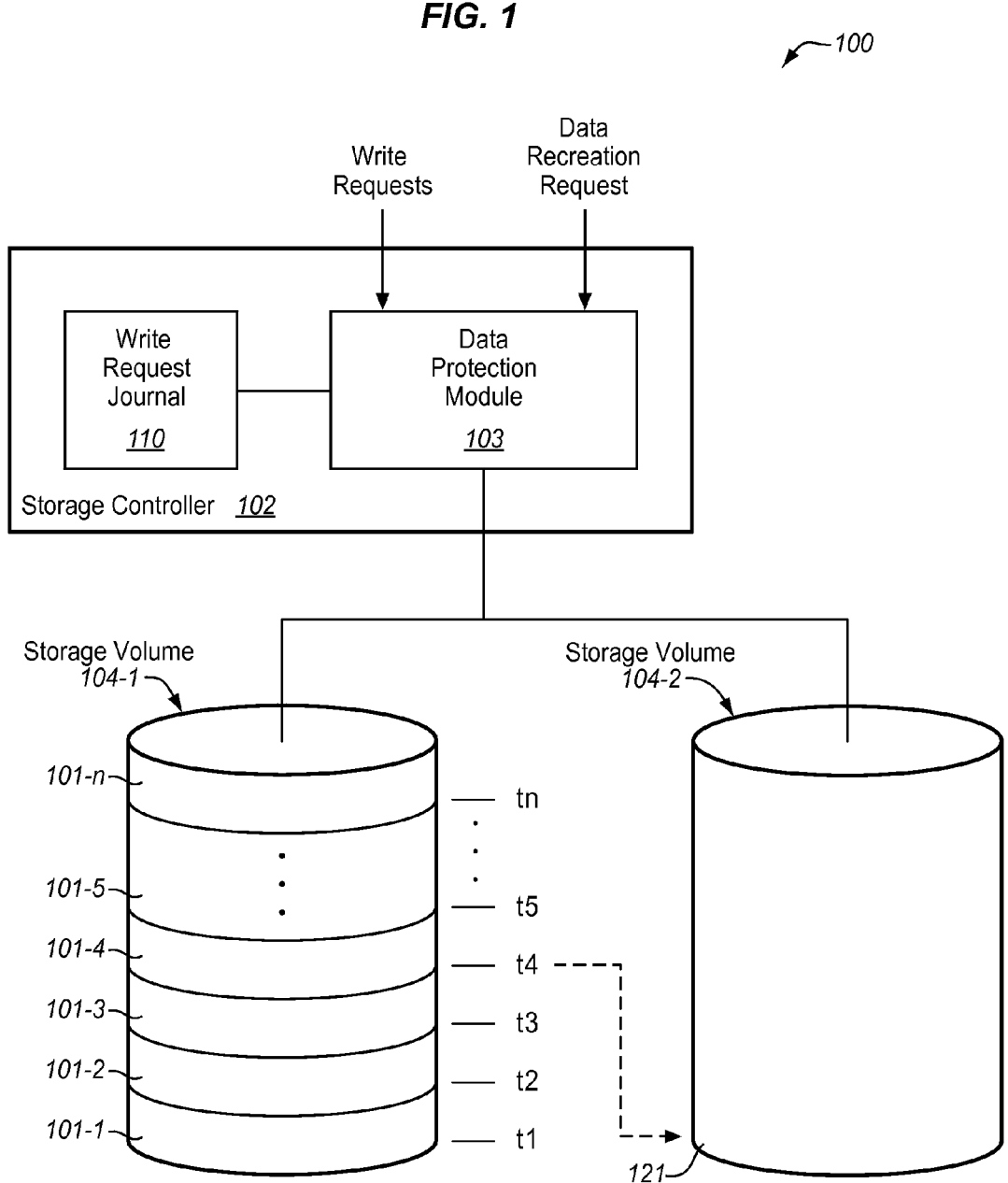
FIG. 1 is a block diagram of an exemplary data storage system with continuous data protection.

FIG. 1 is a block diagram of an exemplary data storage system 100 with continuous data protection. The data storage system 100 is configured with storage volumes 104-1 and 104-2 to store data. Each of the storage volumes 104 represent logical volumes of contiguous storage space that may be spread out over a plurality of physical storage devices (e.g., disk drives). In this regard, a storage controller 102 may be configured with the data storage system 100 to manage I/O requests (i.e., read/write requests) to the storage volumes 104 by directing the requests to the appropriate physical storage devices in a manner that is transparent to the end user. For example, a network computing element may be operable to communicate with the storage controller 102 to transfer read requests and write requests to the storage volume 104-1. Upon receiving the requests, the storage controller 102 may access the appropriate physical storage devices such that the network computing element appears to only access the single storage volume 104-1. Although illustrated as having the same general dimension as the storage volume 104-1, the storage volume 104-2 is not intended to be so limited. For example, the storage volume 104-2 includes a snapshot presentation at the time of implementation and generally has not allocated storage capacity as the storage volume 104-1 (i.e., at least from a host perspective). Additionally, although not illustrated, the storage volume 104-1 generally includes the original data volume as well as the snapshots.

In order to provide data protection for the storage volume 104-1, the storage controller 102 may be configured with a data protection module 103 that is operable to generate snapshots 101-1 . . . n at various points in time t1 . . . tn, such that data may be recovered if necessary from any given time. For example, at a first point in time t1, the data protection module 103 may generate a snapshot 101-1 of the storage volume 104-1. Afterwards, read requests and write requests continue to the storage volume 104-1 via the controller 102 as would normally occur. After a certain period of time, the data protection module 103 generates a second snapshot 101-2 of the data in the storage volume 104-1 at time t2, a third snapshot 101-3 at time t3, and so on.

The data in the storage volume 104-1 may be recreated from any of the generated snapshots 101 using the write requests to the storage volume 104-1. For example, the write requests to the storage volume 104-1 occurring between times t1 and t2 are logged in a write request journal 110 and associated with the snapshot 101-1. Upon receiving a data recreation request, the data protection module 103 may determine the snapshot from which to recreate the data based on a desired time of recreation within the request. That is, the data recreation request may include a time stamp from which a rebuild of the data is desired. The data protection module 103 may use this time stamp to locate a particular snapshot 101 and then access the write request journal 110 to locate and access the write requests to the storage volume 104-1 associated with the snapshot 101. The data protection module 103 may then apply the write requests to the generated snapshot, or actually an image thereof, to rebuild the data of the storage volume 104-1 at the requested time. For example, to recreate the data of the storage volume 104-1, the data protection module 103 creates an image 121 of a generated snapshot 101 and presents that image as the storage volume 104-2. Then, the data protection module 103 may apply write requests from the write request journal 110 to the snapshot image 121 to recreate the data. To further illustrate, the data protection module 103 may receive a data recreation request to rebuild data from a point in time after time t4. The data protection module 103 may then locate the generated snapshot 101-4 associated with that time in the storage volume 104-1. Once located, the data protection module 103 may generate a snapshot image 121 of the snapshot 101-4 and present that snapshot image as the storage volume 104-2. The data protection module 103 then accesses the write request journal 110, as described above, to retrieve the requests occurring after the time t4 and apply those write requests to the snapshot image 121 in the storage volume 104-2. In this regard, write requests to the storage volume 104-1 may continue to the storage volume 104-1 and be logged within the write request journal 110 to ensure that storage operations go uninterrupted in the event that the data contained in the storage volume 104-1 is uncorrupted.

To determine whether the data in the storage volume 104-1 is corrupted, the data protection module 103 may compare the storage volume 104-2 to the storage volume 104-1 to determine any inconsistencies between the two storage volumes. For example, after rebuilding the data from the snapshot image 121 using the write requests from the write request journal 110, the data protection module 103 may compare the data of the storage volume 104-2 to similarly written data (i.e., the same write requests) in the storage volume 104-1. If any inconsistencies exist between the two storage volumes 104-1 and 104-2, the data protection module 103 may present these inconsistencies in the form of the report to the user making the data recreation request. That is, the data protection module 103 may provide the comparison of the two storage volumes 104-1 and 104-2 to the end user such that the end user may determine which storage volume 104 to continue using.

If a determination is made that the storage volume 104-1 does indeed contain corrupted data, the data protection module 103 may cease write operations to the storage volume 104-1 and take the storage volume off-line from the data storage system until the problem may be resolved (e.g., mappings to physical addresses corrected, physical storage devices repaired/replaced, etc.). In the meantime, write operations continue to the storage volume 104-2 while being continually logged in the write request journal 110. If the storage volume 104-1 is deemed uncorrupted, typical storage operations continue to the storage volume 104-1 with the write requests being logged in the write request journal 110.

It should be noted that the periods of time between generated snapshots may be variable or constant. In certain embodiments, the periods of time between generated snapshots may be as short as a few minutes or even seconds such that any requisite data recreation has a minimal impact on the storage operations of the data storage system 100. Additionally, the invention is not intended to be limited to any particular number of storage volumes. Rather, the data storage system 100 is typically configured with multiple storage volumes. For example, the storage controller 102 may be operable to manage a plurality of storage volumes 104, such as those found in RAID storage systems and/or virtualized storage systems. In this regard, the data protection module 103 may have a plurality of storage volumes that may be used to store snapshot images from a corresponding plurality of snapshots. One example of a virtualized storage system is shown and described below in FIG. 10.

Figure 2:
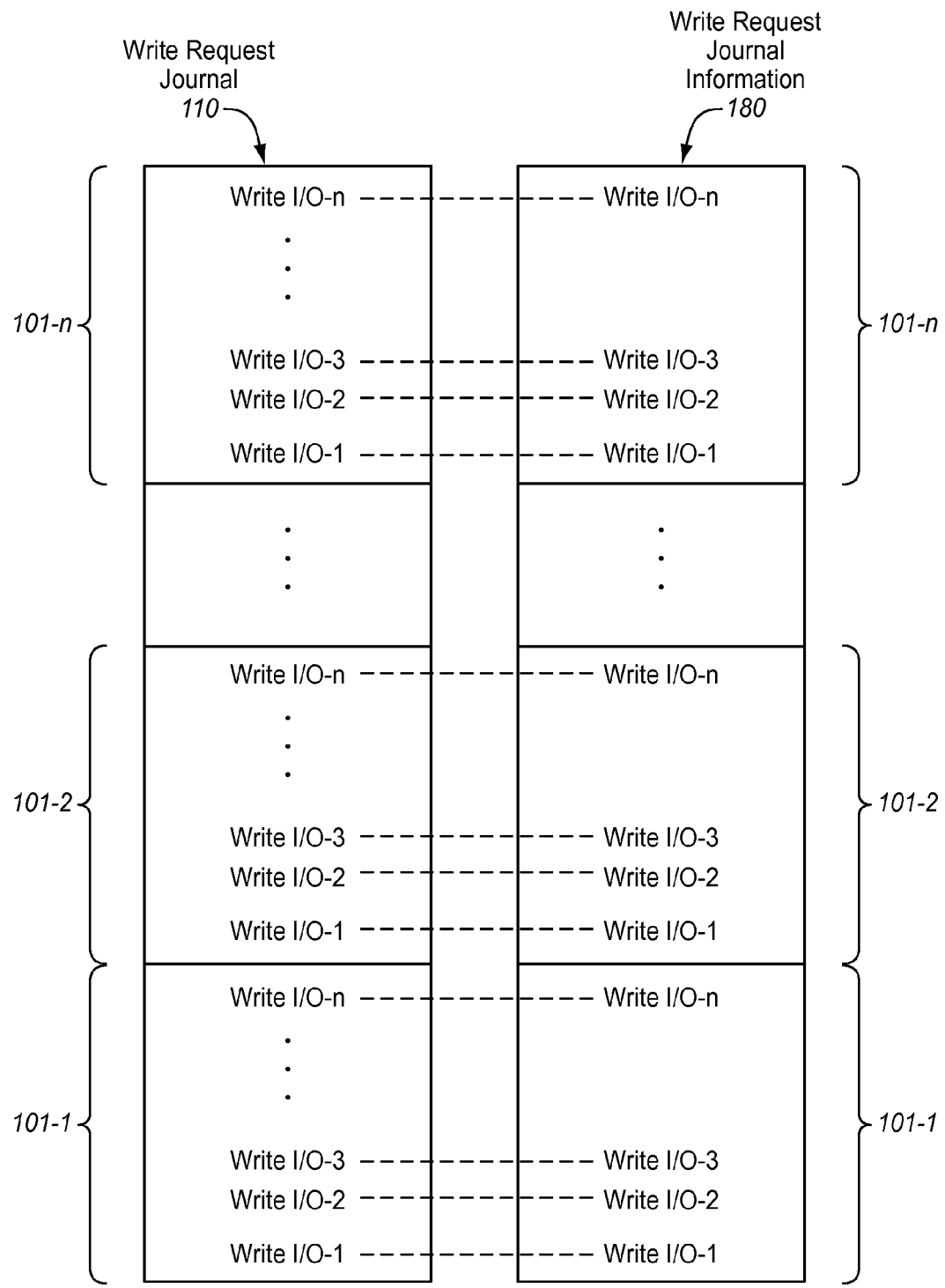
FIG. 2 illustrates an exemplary write request journal.

FIG. 2 illustrates an exemplary write request journal 110. The request journal 110 is partitioned according to the generated snapshots 101-1 . . . n and includes each of the write requests occurring after a particular snapshot 101 (and before a subsequent snapshot) such that the write requests may be obtained and applied to the generated snapshot 101 more quickly. To assist in this manner, the write request journal 110 may also be associated with a file that includes write request journal information 180. The write request journal information 180 may include write I/O information-1 . . . n that is associated with each generated snapshot and includes information pertaining to the time, location, and/or basic operation of a particular write request such that the particular write request may be quickly retrieved at applied to the generated snapshot. In this regard, the write request journal information 180 may be stored in a quickly accessible memory, such as a computer memory of the storage controller 102. With this write request journal information 180 allowing the write requests of the write request journal 110 to be quickly accessible, the write request journal 110 may be stored in a variety of places. For example, the write request journal 110 and/or copies thereof may be stored in the storage controller 102, the storage controller 104-1, the storage controller 104-2, or even with a host system communicatively coupled to the storage controller 102.

The storage controller 102 may be configured in a variety of well-known manners, including various combinations of software, hardware, and firmware. In this regard, the data protection module 103 may be similarly configured within the storage controller 102 to generate snapshots 101 within the storage volume 104-1, provide a snapshot image 121 to the storage volume 104-2, and apply write requests to the snapshot image to recreate the data of the storage volume 104-1.

FIGS. 3A and B illustrate a more detailed albeit exemplary write request journal 110 entry and the write request journal information 180 (a.k.a. the "short journal") associated with each write request in the journal 110. In this embodiment, FIG. 3A represents a header added to the write request journal 110 and FIG. 3B represents the write request journal information 180. The write request information 180 acts as a sort of lookup table for the write requests in the journal 110 such that they may be quickly identified and accessed within the journal 110. In addition to including the actual data of the write request, the write request journal 110 includes a variety of fields that may be used to identify a particular write request. Examples of such details include the incremental log ID of each write request, the date and time of the write request, the line block address (LBA) of the write request to a virtual volume, the number of LBAs in the write request, the initiator ID of the write request, and a completion flag indicating the end of the data (e.g., a checksum). The short journal, on the other hand, includes simply header information pertaining to the write request journal information 180. In this regard, the short journal many of the same fields of the write request journal 110, such does the header, the log ID, the date and time, the LBA of the request of the virtual volume, the number of LBAs in the write request, the initiator ID of the device sending the write request. Additionally, the short journal may include an index of the corresponding journal block, an offset beginning from the corresponding journal block, and a status of the write request (e.g., to determine whether it was applied to the original volume and/or the data journal). This information is required in order to locate an actual data request within Journal 110.

Figure 4:
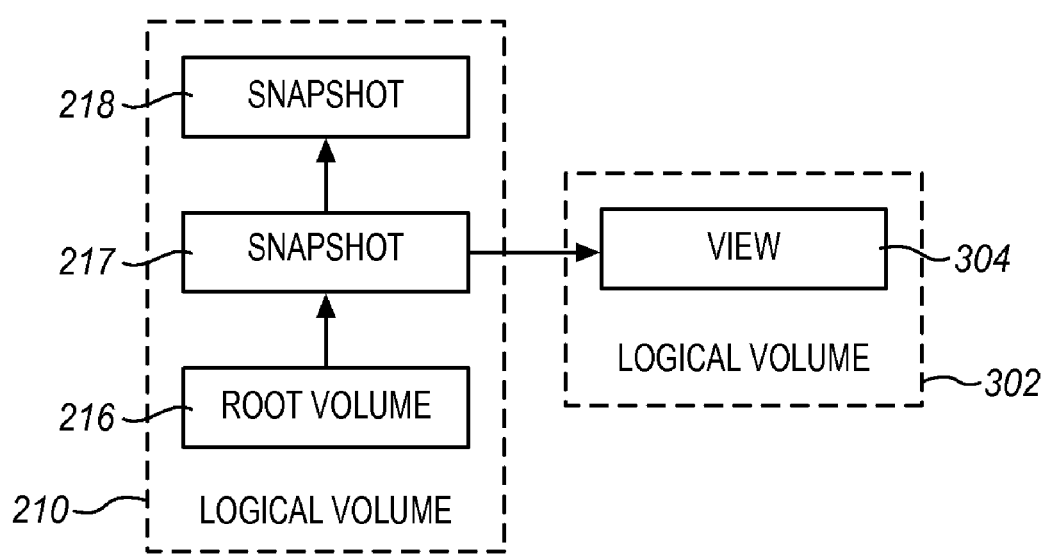
FIG. 4 is a block diagram illustrating a variety of exemplary snapshot and view configurations.

FIG. 4 is a block diagram illustrating a variety of exemplary snapshot and view configurations that may be used in the data storage system 100. In this embodiment, the logical volume 210 is comparable to the storage volume 104-1 and includes a root volume 216 (e.g., a snapshot 101-1) and snapshots 217-218. A view is a modifiable set of snapshots and/or root volume combinations that are accessible as a new logical volume. The logical volume 302 may exist as another storage volume 104 within the data storage system 100 and includes the view 304 that is generated from the snapshot 217 of the logical volume 210. In this case, the view 304 is a modifiable logical volume including the root volume 216 and the snapshot 217 of the logical volume 210. The views allow various independent branches of the original logical volume 210 to be created and modified, without altering the original logical volume 210. For example, a user may wish to create view 304 within the logical volume 302. By creating the view 304 in the logical volume 302, a user can operate on data without interfering with the operation of the original logical volume 210. When reading data from the logical volume 302, the data contained within the current snapshot 217, any previous snapshot, or the root volume 216 is part of the chain of snapshots between the root volume 216 and the current snapshot 217. It is possible to create multiple views for the same or different snapshots and present them as separate logical volumes at the same time.

Figure 5:
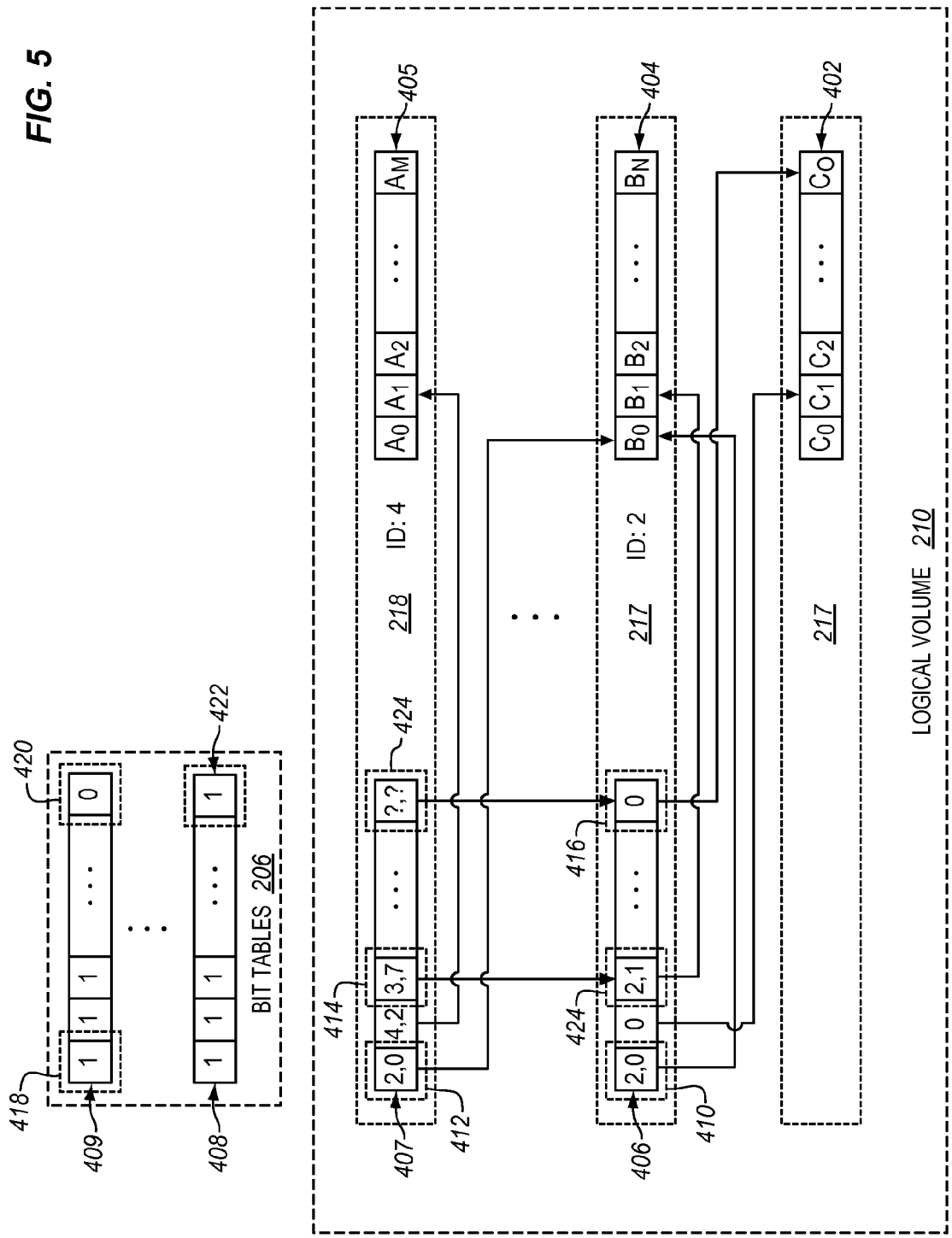
FIG. 5 is a block diagram illustrating an exemplary series of snapshots and bit tables.

FIG. 5 further illustrates how the data storage system 100 may use the exemplary snapshots 217-218. The logical volume 210 illustrated in FIG. 4 includes the root volume 216. The root volume 216 includes storage 402 that details various portions of storage C0-CO for the root volume 216. When the logical volume 210 is first created within data storage system 100, the root volume 216 may be mapped to physical storage devices. After the logical volume 210 is created, but before any snapshots are generated, I/O requests processed by storage controller 102 are written to the root volume 216. For example, a write request for block address twenty may be generated by a host system and written persistently to portion C0 of the root volume 216. In like manner, portions C1-CO may be utilized for persistent storage of data before any snapshots are created for the logical volume 210. At some point in time, the snapshot 217 may be generated. A snapshot 217 generally includes a temporary volume 404 and a relocation table 406. Additionally, an identification number (ID) may be assigned to the snapshot 217 (e.g., ID: 2). Identification numbers may be to identify specific snapshots within relocation entries of relocation tables. The snapshot presentations may also be protected with via this continuous data protection such that snapshots and journaling may be applied for all write requests arriving at a particular snapshot presentation.

The relocation entries may use ID information assigned to a snapshot to determine which snapshot contains the temporary volume in which the requested data resides upon. For example, the relocation entry 410 of the snapshot 217 has an exemplary value of (2,0). In this example, 2 indicates a snapshot ID of 2 (i.e., snapshot 217) containing the temporary volume with the desired data. Additionally, 0 indicates an offset from the beginning of the temporary volume (i.e., temporary volume 404) identifying the portion of storage containing the data. Thus, the example value (2,0) in the relocation entry 410 of the relocation table 406 indicates that the data is contained on the snapshot 217 (i.e., ID 2) at an offset 0 (i.e., portion B0) of the temporary volume 404. The relocation tables may contain entries that identify that specific data exists on the storage 402 of the root volume 216. One example utilizing this concept within the snapshot 217 includes relocation entries that indicate zero. In those cases, I/O processing to locate data would access portion of the storage 402 of the root volume 216 (e.g., portions C1 and C0).

Other types of relocation information may reside within entries of a relocation table. For example, a predefined value may indicate an initialized entry, or more specifically, that an entry does not map to persistent storage. This may occur when a relocation table is first generated along with a temporary volume within a snapshot. One example of this is the entry value 424 (?,?) in the relocation table 407. In this example, (?,?) indicates that the entry 424 does not map to a portion of storage on either a temporary volume or a root volume. Instead, the storage controller 102 may read an earlier snapshot relocation table (e.g., the relocation table 406 of snapshot 217) to identify the portion of storage containing the data.

Relocation entries may correspond to portions of storage within snapshots different than that which contain the relocation tables. For example, the relocation entry 412 of snapshot 218 has a value of (2,0), indicating that data for this entry resides on snapshot ID 2 at an offset of 0. The relocation table 407 resides within the snapshot 218 while the relocation entry 412 corresponds to portion of storage B0 within the snapshot 217. An additional type of relocation entry is illustrated in the relocation entry 414. The relocation entry 414 has an exemplary value of (3,7), indicating an ID of a snapshot not shown. In this illustration, the snapshot ID 3 has been deleted. The storage controller 102 may read the relocation table of a temporally earlier snapshot (e.g., ID 2 or snapshot 217) to identify the portion of storage.

In one embodiment, the storage controller 102 is operable to receive I/O requests for the logical volume 210. Responsive to receiving the I/O request, the storage controller 102 processes the I/O request to identify relocation entries in relocation tables of a snapshot. For example, the storage controller 102 may receive a read I/O request for block address twenty for the logical volume 210. In this example, we will consider that a plurality of snapshots exists within the logical volume 210 (i.e., the snapshots 217-218). After receiving the I/O request for reading block address twenty, the storage controller 102 may identify a relocation entry 412 of the snapshot 218. The relocation entry 412 may be identified by processing the I/O request in a number of ways. For example, the I/O request may include block address twenty for logical volume as a parameter within the I/O request. Additionally, the relocation entry 412 may include data that associates the relocation entry 412 specifically with block address twenty of the logical volume 210. In like manner, other relocation entries within the relocation table 407 may map other I/O requests to different block addresses of the logical volume 210.

Responsive to identifying the relocation entry 412, the storage controller 102 is further operable to identify a corresponding portion B0 on the temporary storage 404 of the snapshot 217. Because the relocation entry 412 has an exemplary value of (2,0), the portion of storage corresponding with the relocation entry 412 is ID: 2, offset 0, or more specifically, the portion B0 within the snapshot 217.

Responsive to identifying the corresponding portion B0 of storage, the storage controller 102 is further operable to respond to the I/O request for the logical volume 210 by accessing the portion B0 on the temporary volume 404. Because the snapshot 218 is temporally newer than the snapshot 217, the portion B0 in this example is read-only (i.e., the snapshot 217 freezes or captures the state of B0 after the snapshot 218 is generated). If, for example, the I/O request was a write request for block address twenty, then the new data for block address twenty contained within the write I/O request would be written to the current snapshot (i.e., the temporary volume 405 of the snapshot 218). Thus, each successive snapshot captures changes to the logical volume 210 until a subsequent snapshot is generated. Because the relocation entry 412 is utilized to identify and access alternate portions of storage in temporary volumes different than the snapshot 218, fewer I/O operations are generated when identifying and accessing data within snapshots.

When each new snapshot is generated, a temporary volume of storage may be allocated on one or more physical storage devices. Additionally, relocation tables associated with the temporary volume of storage are created. In some cases, relocation entries are generated with initial values. In other cases, relocation entries in temporally earlier snapshots may be copied into the created relocation tables. For example, when the snapshot 218 is created, entries in the relocation table 406 may be copied to the newly generated relocation table 407 as a matter of design choice, such as by copying the relocation entry 410 within the snapshot 217 to the relocation entry 412 of the snapshot 218. Additionally, relocation entries may be copied from temporally earlier snapshots responsive to accessing an invalid or initialized relocation entry. For example, if the storage controller 102 identifies the relocation entry 424 as invalid or containing a non-initialized value, the storage controller 102 may copy a valid relocation entry 416 from a temporally earlier snapshot (i.e., the snapshot 217) to the relocation entry 424 after identifying that snapshot 217 contains the valid relocation entry desired. In some cases, relocation entries per se may include information about whether the entry is valid or invalid. In other cases, metadata bit tables may be generated and utilized to store such information about relocation tables.

Additionally, bit tables 206 may be configured within memory of the storage controller 102. The bit tables 206 may be metadata generated from the relocation tables 406-407. For example, the bit table 409 includes a plurality of entries, each entry associated with one or more relocation entries of the relocation table 407. Each bit entry in the bit table 409 indicates whether a corresponding relocation entry is valid or invalid. In this example, the bit entry 418 is a binary 1 indicating that corresponding relocation entry 412 is valid. Conversely, the bit entry 420 is a binary 0 indicating the relocation entry 424 is invalid.

A number of I/O operations can be eliminated when the storage controller 102 utilizes bit tables to identify valid or invalid relocation entries in a corresponding plurality of relocation tables. Consider, for example, the snapshot 218 is the current snapshot of some thousand of snapshots for the logical volume 210. In this example, the snapshot 217 would be the first, or temporally, the earliest snapshot within the logical volume 210. If an I/O request was received by the storage controller 102, the temporally newer snapshot (i.e., the snapshot 218) may first be analyzed to determine if a relocation entry identified in the I/O request contained valid data. For example, if the I/O request was processed to first identify the relocation entry 424 of the snapshot 218 and the relocation entry was invalid (e.g., ?,? in this example), then potentially a large number of relocation tables may have to be processed before identifying the relocation entry 416 in the earliest snapshot 217. Arguably, the storage controller 102 may only perform this operation once, because after the identifying relocation entry 416 as being valid, the relocation entry 416 may be copied to the current snapshot 218. Nevertheless, additional performance benefits can be gained by utilizing the bit tables 206 to identify whether corresponding relocation entries are valid or invalid. Because bit tables 206 may be stored in memory, accessing the bit tables 206 may be performed many times faster than accessing the relocation tables 406-407 that may be stored persistently on slower physical storage devices.

The storage controller 102 may utilize the bit tables 206 for improved performance by first identifying bit entries in bit tables corresponding to I/O requests. For example, for the I/O request corresponding to the relocation entry 424 above, the bit entry 420 of the bit table 409 may be read to identify that relocation entry 424 is invalid. The storage controller 102 may, in response to determining that the bit entry 420 is invalid, process each of the plurality of bit tables 408-409 to identify a bit entry which corresponds to the I/O request and is valid. For example, in a similar manner to processing an I/O request to identify a relocation entry in a relocation table, the storage controller 102 may additionally process the I/O request to identify a bit entry in a bit table. In cases where bit entries indicated invalid underlying relocation data, alternate bit tables may be processed to identify a valid relocation entry. For example, the bit entry 422 within the bit table 408 may indicate that the relocation entry 416 is valid, thus, the storage controller 102 may skip processing relocation tables directly and instead may locate and identify the snapshot 217 as containing the desired data. This type of bit table processing by the storage controller 102 allows for additional performance improvements.

When the bit tables 206 are utilized to improve the performance of the data storage system 100, the bit tables may include similar features utilized when updating and maintaining the relocation tables 406-407 disclosed previously, such as copying temporally earlier bit tables to temporally newer bit tables, generating bit tables when the data storage system 100 starts by reading and processing the relocation tables 406-407, or other methods as a matter of design choice.

In some cases, a snapshot may be marked for deletion. When a snapshot is marked for deletion, entries in a temporally earlier snapshot are merged with corresponding entries of the snapshot marked for deletion. For example, the snapshot 218 may be marked for deletion. Before the relocation table 407 is deleted, entries within the relocation table 407 that have changed within the snapshot 218 are merged with entries within the relocation table 406. For example, the relocation table 407 includes an entry value of (4,2) which points to location A1 in the temporary volume 405. Because this entry value has changed within the snapshot 218, this entry value is merged with a corresponding entry position in the relocation table 406. Entries that have not changed within the relocation table 407 are not merged with entries in the relocation table 406. For example, because the entry 414 has not changed within the snapshot 218, the entry 414 is not merged with the entry 424 within the snapshot 217.

Figure 6:
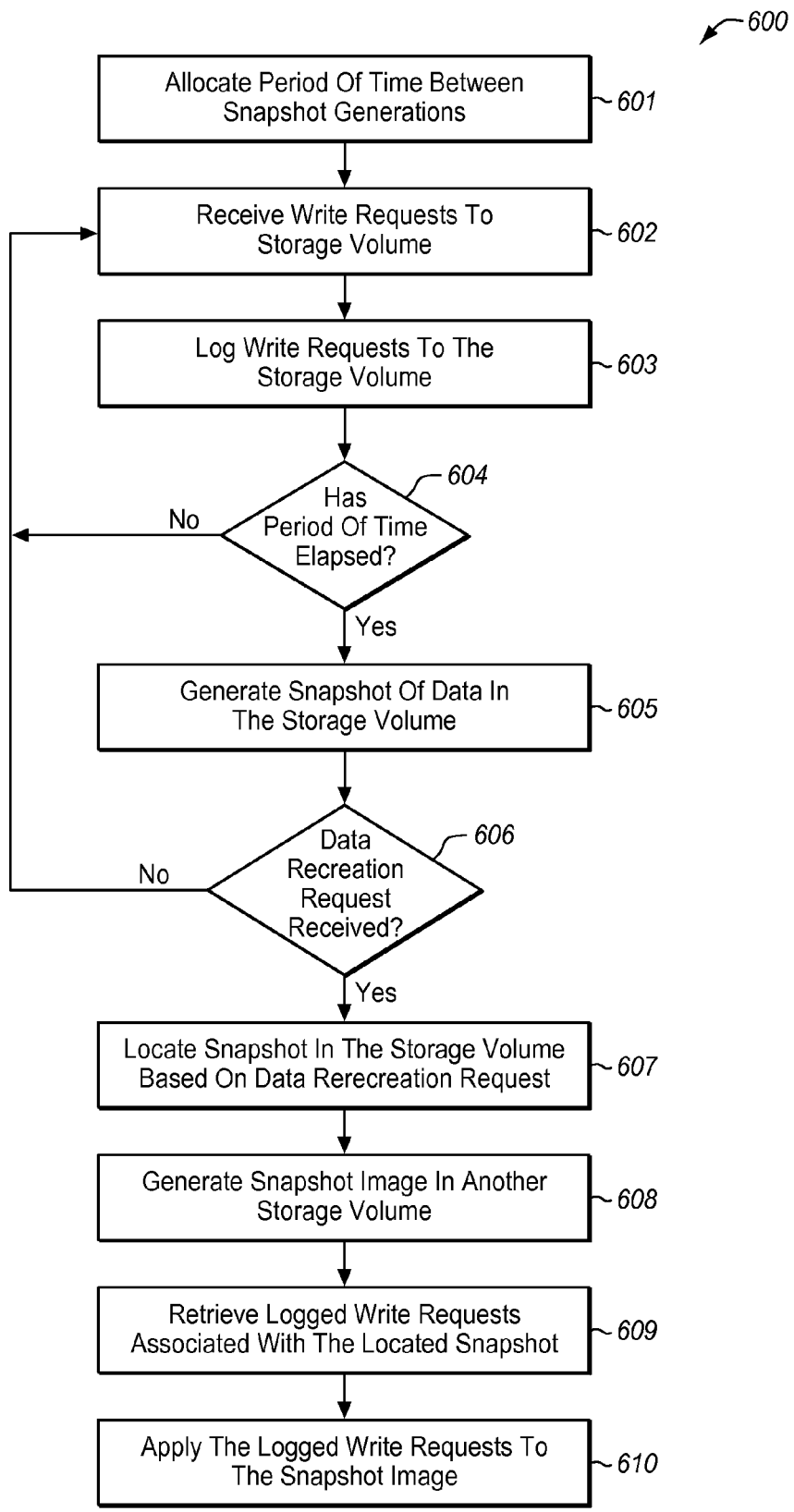
FIG. 6 is a flowchart of an exemplary process for providing continuous data protection in a data storage system.

FIG. 6 is a flowchart of a process 600 for providing continuous data protection in a data storage system. In this embodiment, a period of time is first allocated between the generations of snapshots in a storage volume, in the process element 601. For example, an end user may configure the data protection module 103 with one or more periods of time that are used to establish the snapshot generations. Write requests to the storage volume may then be received as is typical in data storage operations, in the process element 602. These write requests may be logged, in the process element 603, for subsequently re-creating data.

After the allocated period of time has elapsed, in the process element 604, a snapshot of the data in the storage volume is generated, in the process element 605; otherwise, the process element 604 continually writes to the storage volume. Similarly, the generations of the snapshots of data in the storage volume are continued until a data recreation request is received, in the process element 606. If not, the process 600 returns to the process elements 604 and 605 to continue writing to the storage volume and generating snapshots of the data therein. Although, it should be noted that snapshot generation in and write requests to the original storage volume may persist regardless of the data recreation request as determinations to cease such operations may be performed as desired. Once the data recreation request is received, the snapshot is located in the storage volume based on information within the data recreation request, in the process element 607. For example, the data recreation request may include a time stamp and a location of a particular snapshot from which data is to be recreated. Based on this information, a storage controller may retrieve the snapshot from the storage volume and generate a snapshot image from that snapshot of data, in the process element 608. The storage controller may store the snapshot image in another storage volume to assure the integrity the data because the odds of two storage volumes containing corrupted data are less likely.

With the snapshot image stored in the other storage volume, logged write requests that are associated with the generated snapshot may be retrieved, in the process element 609, such that they may be applied to the snapshot image, in the process element 610. In other words, the snapshot image may be used to rebuild the data of the generated snapshot using write requests occurring after the snapshot was generated. Afterwards, the two storage volumes may be compared to determine whether the two storage volumes contain the same data. If the two storage volumes do indeed contain the same data after rebuilding the data in the second storage volume, write requests may continue to the original storage volume, in the process elements 602. Otherwise, a determination may be made as to whether one of the storage volumes is corrupt. For example, the end-user upon observing the comparison to the storage volumes may determine that the original storage volume includes corrupted data. Thus, the end-user may decide that the storage volume with the snapshot image may be best for continued storage operations and direct subsequent write requests to the storage volume.

Figure 7:
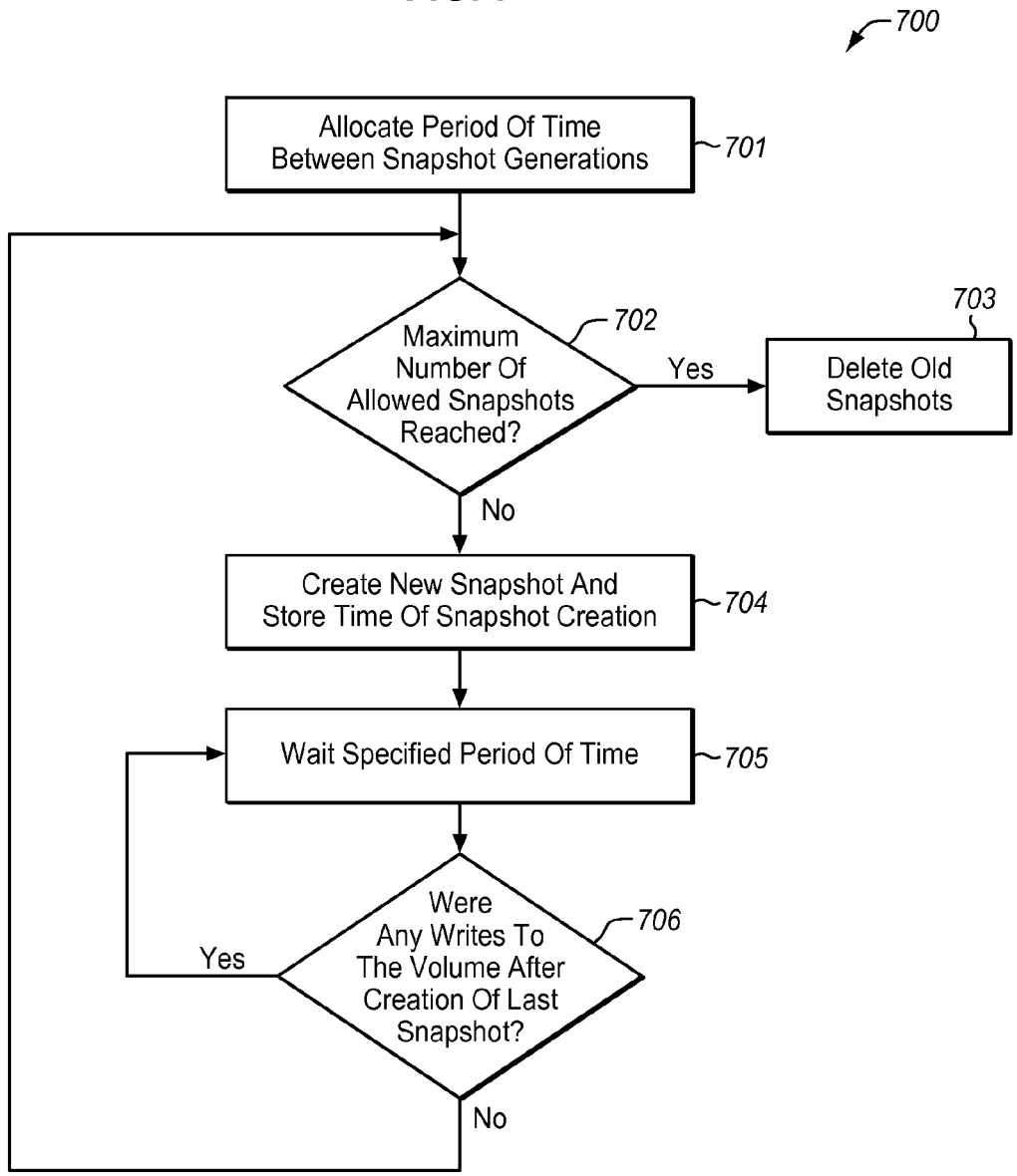
FIG. 7 is a flowchart of an exemplary process of generating snapshots for continuous data protection in a data storage system.

FIG. 7 is a flowchart of an exemplary process 700 of generating snapshots for continuous data protection in the data storage system 100. In this more detailed embodiment, the data protection module 103 may allocate a period of time (e.g., on the order of seconds) between snapshot generations within the storage volume 104-1, in the process element 701. In doing so, the data protection module 103 may determine whether a maximum number of allowed snapshots has been reached, in the process element 702. For example, the data protection module 103 may allocate a certain number of snapshots within a time period so as to delete unnecessary snapshots from storage when no data restoration request had been made in that period of time. In this regard, the data protection module 103 may delete old snapshots, in the process element 703 and free storage space within the storage volume 104-1. Otherwise, the data protection module 103 may create a new snapshot and store the time of that snapshot within the write request journal information 180, in the process element 704. Thereafter, the data protection module 103 may wait its specified period of time, in the process element 705, before generating another snapshot. After that snapshot has been generated, the data protection module 103 may determine whether there were any write requests to the storage volume 104-1 after creation of the last snapshot, in the process element 706. If not, the data protection module 103 returns to the process element 705 to wait its specified period of time. If there were write requests to the storage volume 104-1, then the data protection module 103 may return to the process element 704 to determine whether a maximum number of snapshots has been generated It should also be noted that the process 700 may return to the process element 704 after deleting snapshots in the process element 703 so as to continue generating snapshots.

Figure 8:
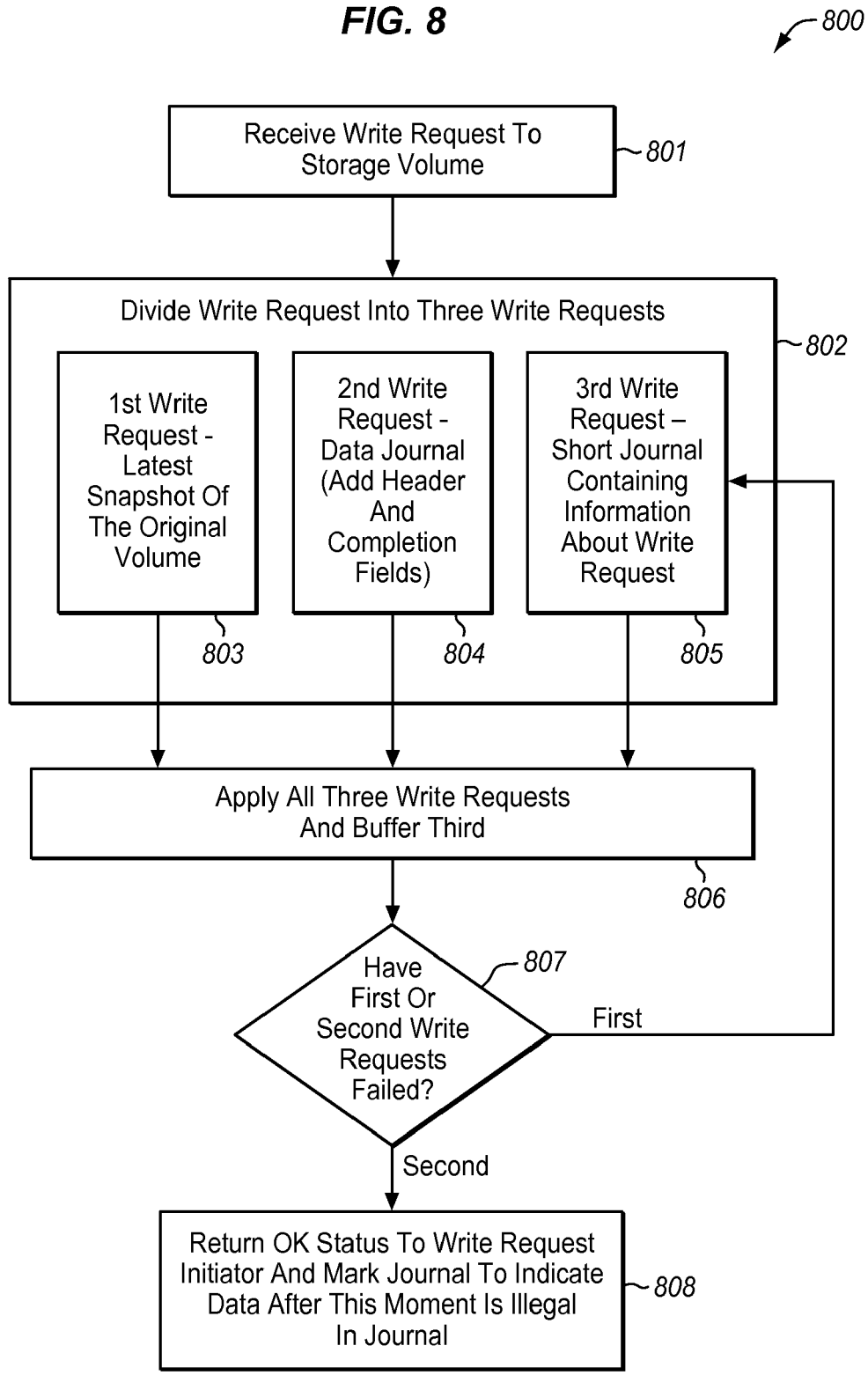
FIG. 8 is a flowchart of an exemplary process of I/O routing for continuous data protection in a data storage system.

FIG. 8 is a flowchart of an exemplary process 800 of I/O routing for continuous data protection in the data storage system 100. In this more detailed embodiment, the storage controller 102 may receive a write request to the storage volume 104-1, in the process element 801. The data protection module 103 may divide the write requests into three separate write requests, in the process element 802. The data protection module 103 generates the first write request to the latest snapshot of the original volume (e.g., the storage volume 104-1), in the process element 803. The data protection module 103 generates the second write request to the data journal of FIG. 3A including header, data, and completion fields, in the process element 804. The data protection module 103 generates the third write request to the short journal of FIG. 3B such that it includes information about the write request, in the process element 804. The data protection module 103 then applies all three of these write requests, and buffers the third write request 805. In doing so, the data protection module 103 may determine whether the first or the second write requests 803/804 have failed, in the process element 807. If the first write request 803 has failed, the data protection module 103 returns to the process element 802 to regenerate the third write request to the short journal. If however the second write request 804 has failed, the data protection module 103 returns an OK status to the write request initiator and marks the journal to indicate data after this point in time is illegal in the journal.

Figure 9:
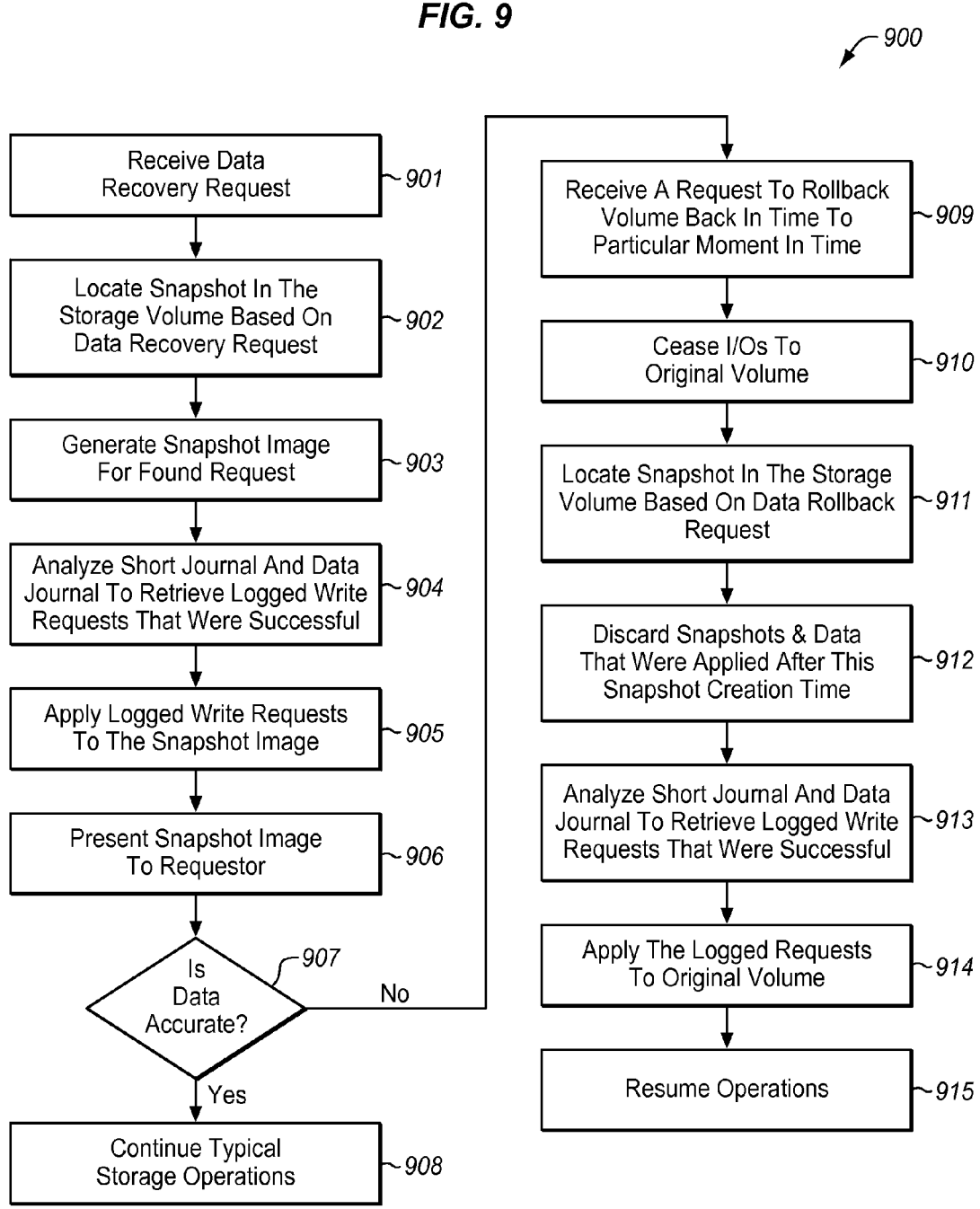
FIG. 9 is a flowchart of an exemplary process of data recovery for continuous data protection in a data storage system.

FIG. 9 is a flowchart of an exemplary process 900 of data recovery for continuous data protection in the data storage system 100. In this more detailed embodiment, the data protection module 103 may initiate data recovery upon receiving a data recovery request, in the process element 901. Once received, the data protection module 103 may locate the snapshot in a storage volume 104-1 based on information contained within the data recovery quest (e.g., a timestamp), in the process element 902. The data protection module 103 may then generate a snapshot image for the located request, in the process element 903. Thereafter, the data protection module may analyze the short journal and the data journal to retrieve logged write requests that were successful to the storage volume 104-1, in the process element 904. The data protection module 103 may then apply the logged write requests to the snapshot image in the storage volume 104-2 to restore the data, in the process element 905, and present that snapshot image to the user requesting data restoration, in the process element 906. If the data is accurate, storage operations to the storage volume 104-1 may continue, in the process element 908. Otherwise, the user may generate a request that directs the data protection module 103 to rollback the storage volume 104-1 to a particular moment in time, in the process element 909. Thereafter, the data protection module 103 may cease I/O operations to the storage volume 104-1, in the process element 910. The data protection module 103 then locates a snapshot in the storage volume 104-1 based on the data rollback request, in the process element 911, and discard snapshots and data there were applied after the snapshot creation time, in the process element 912. The data protection module 103 may analyze the short journal and the data journal to retrieve logged write requests that were successful, in the process element 913, and apply the logged write requests to the storage volume 104-1, in the process element 914 such that typical storage operations may be resumed, in the process element 915.

Figure 10:
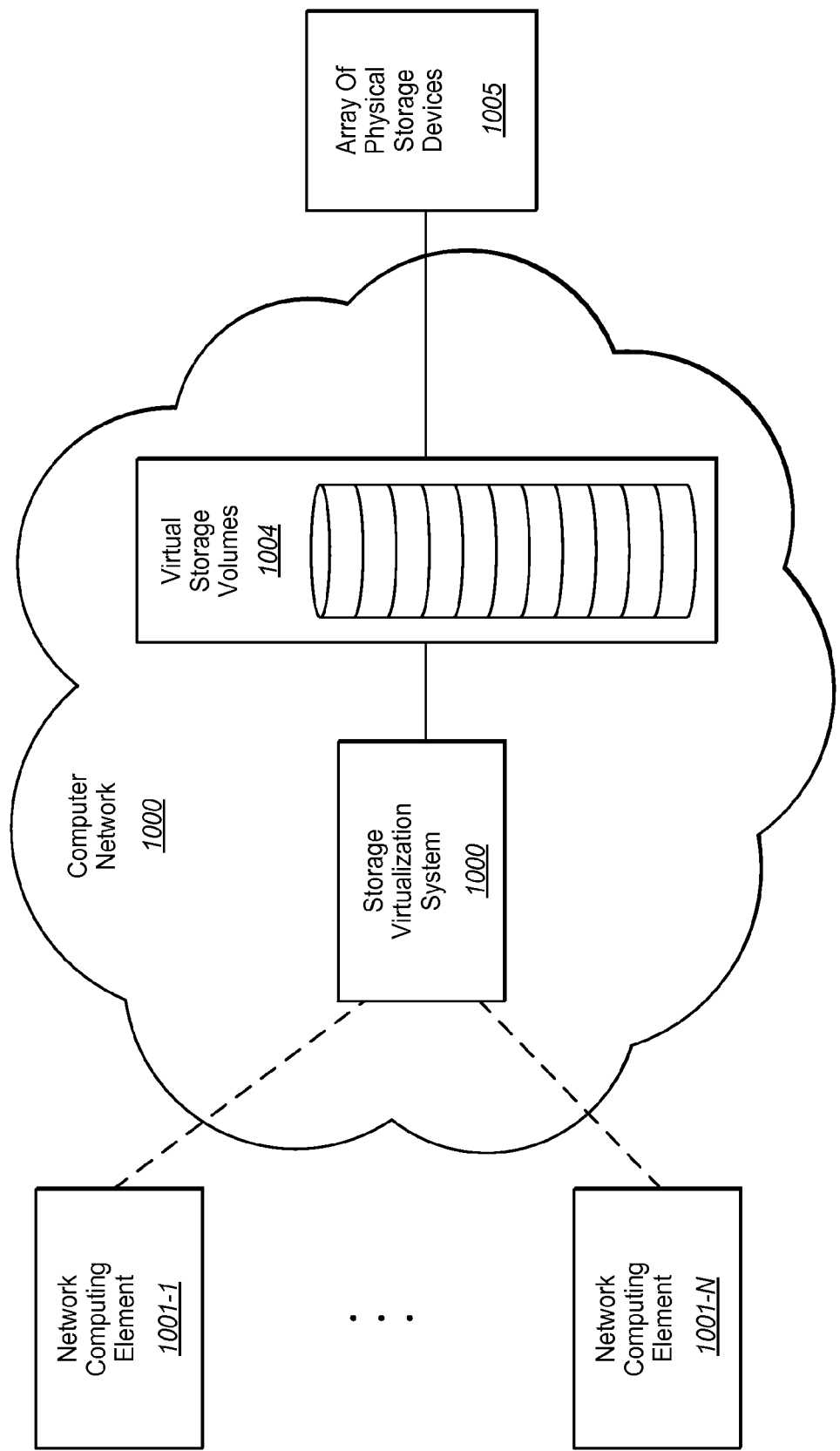
FIG. 10 is a block diagram of an exemplary data storage system employing storage virtualization and continuous data protection.

FIG. 10 is a block diagram of an exemplary storage virtualization system 1000. In this embodiment, the storage virtualization system 1000 is operable to virtualize an array of physical storage devices 1005 as a plurality of virtual storage volumes 1004, with each virtual storage volume having a specified amount of contiguous storage space. For example, the array of physical storage devices 1005 may include a variety of disk drives or other storage systems having various storage sizes and/or manufactured by multiple manufacturers. The storage virtualization system 1000 is operable to interface with the physical storage devices and configure them as a single logical pool of storage. The storage virtualization system 1000 masks the details and the locations of the individual storage devices in the array 1005 by mapping logical storage addresses to physical storage addresses of the physical storage devices. The storage virtualization system 1000 is generally configured within a computer network 1002 such that individual network computing elements 1001-1 . . . n may access data from a plurality of physical locations across the computer network.

In addition to virtualizing the array of physical storage devices 1005, the storage virtualization system 1000 is generally operable to provide continuous data protection. In doing so, the storage virtualization system 1000 may generate snapshots of data within the virtual storage volumes 1004. In this regard, the storage virtualization system 1000 may include functionality such as that found in the data protection module 103 above. The storage virtualization system 1000 may be operable to receive and log write requests to the storage volumes 1004 such that data may be rebuilt from the generated snapshots at a later time. For example, the storage virtualization system 1000 may generate a snapshot image from one of the generated snapshots after receiving a request to rebuild data. The storage virtualization system 1000 may store the snapshot image in another storage volume separate from the storage volume containing the generated snapshot.

The storage virtualization system 1000 may then locate the logged write requests associated with the generated snapshot and apply those write request to the snapshot image to rebuild the data. The storage virtualization system 1000 may compare the two storage volumes of the generated snapshot and the snapshot image and present the comparison to an end user for determination of the appropriate storage volume to use.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method of protecting data in a data storage system, the method comprising:
    allocating a period of time between creating snapshots of data in a first storage volume;
    receiving and logging write requests to the first storage volume;
    generating a snapshot of data in the first storage volume after the allocated period of time;
    receiving a request to recreate data;
    locating the snapshot of data in the first storage volume based on the request to recreate the data;
    generating a snapshot image in a second storage volume based on the located snapshot, wherein the snapshot image comprises data obtained from the located snapshot;
    retrieving logged write requests received after the snapshot was generated; and
    applying the logged write requests to the snapshot image to recreate the data of the first storage volume in the second storage volume.

2. The method of claim 1, further including logging subsequently received write requests and directing the subsequently received write requests to the first and second storage volumes.

3. The method of claim 1, further including comparing the second storage volume to the first storage volume after recreating the data in the second storage volume to determine inconsistency between the two volumes.

4. The method of claim 3, further comprising ceasing write requests to the first storage volume upon determining said inconsistency between the two volumes.

5. The method of claim 3, further including presenting the comparison to an end user.

6. The method of claim 1, wherein the data storage system is a virtualized data storage system.

7. The method of claim 1, further comprising:
    generating a journal to log the write requests; and
    storing the journal in: the first storage volume; the second storage volume; memory of a storage controller; memory of a network computing device; or a combination thereof.

8. The method of claim 7, further comprising generating a lookup table that includes information about each received write request in the journal associated with the snapshot to identify a location of the write requests.

9. The method of claim 1, further comprising processing the request to recreate data to extract a time stamp in the request and identify the snapshot.

10. The method of claim 1, wherein the allocated period of time between snapshots is constant.

11. The method of claim 1, wherein the allocated period of time between snapshots is variable.

12. A data storage system, comprising:
    first and second storage volumes operable to store data;
    a controller communicatively coupled to the first and second storage volumes, wherein the controller is operable to manage read requests and write requests to the first and second storage volumes, the controller comprising a data protection module operable to log the write requests to the first storage volume, generate a snapshot of data in the first storage volume after an allocated period of time, receive a request to recreate data, locate the snapshot of data in the first storage volume based on the request to recreate data, and generate a snapshot image in the second storage volume based on the located snapshot, wherein the data protection module is further operable to retrieve logged write requests received after the snapshot was generated and apply the logged write requests to the snapshot image to recreate data of the first storage volume in the second storage volume.

13. The data storage system of claim 12, wherein the data protection module is further operable to log subsequently received write requests and directing the subsequently received write requests to the first and second storage volumes.

14. The data storage system of claim 12, or in the data protection module is further operable to compare the second storage volume to the first storage volume after recreating the data in the second storage volume to determine inconsistency between the two volumes.

15. The data storage system of claim 14, wherein the data protection module is further operable to cease write requests to the first storage volume upon determining said inconsistency between the two volumes.

16. The data storage system of claim 12, wherein the data storage system is a virtualized data storage system.

17. The data storage system of claim 12, wherein the data protection module is further operable to generate a journal to log the write requests and store the journal in: the first storage volume; the second storage volume; memory of a storage controller; memory of a network computing device; or a combination thereof.

18. The data storage system of claim 17, wherein the data protection module is further operable to generate a lookup table that includes information about each received write request in the journal associated with the snapshot to identify a location of the write requests.

19. The data storage system of claim 12, wherein the data protection module is further operable to process the request to recreate data to extract a time stamp in the request and identify the snapshot.

20. A computer readable medium operable to store a software product for use within a virtualized storage system controller, the software product comprising instructions for directing the virtualized storage system controller to:

receive and log write requests to a first storage volume of the virtualized storage system;

generate snapshots of data in the first storage volume after allocated periods of time;

receive a request to recreate data of the first storage volume;

locate one of the snapshots of data in the first storage volume based on the request to recreate the data;

generate a snapshot image in a second storage volume of the virtualized storage system based on the located snapshot;

retrieve logged write requests received after the located snapshot was generated; and apply the logged write requests to the snapshot image to recreate the data of the first storage volume in the second storage volume.

* * * * *